US011619399B1

(12) United States Patent
White

(10) Patent No.: US 11,619,399 B1
(45) Date of Patent: Apr. 4, 2023

(54) SYSTEMS AND METHODS FOR DIRECT USE OF SOLAR ENERGY

(71) Applicant: William H. White, Bonito Springs, FL (US)

(72) Inventor: William H. White, Bonito Springs, FL (US)

( * ) Notice: Subject to any disclaimer, the term of this patent is extended or adjusted under 35 U.S.C. 154(b) by 0 days.

(21) Appl. No.: 17/481,654

(22) Filed: Sep. 22, 2021

(51) Int. Cl.
| | |
|---|---|
| *F24S 20/40* | (2018.01) |
| *F24S 10/40* | (2018.01) |
| *F24S 23/00* | (2018.01) |
| *F24D 5/00* | (2022.01) |
| *G05B 19/401* | (2006.01) |
| *F24D 19/10* | (2006.01) |

(52) U.S. Cl.
CPC ........... *F24D 5/005* (2013.01); *F24D 19/109* (2013.01); *F24S 10/40* (2018.05); *F24S 20/40* (2018.05); *F24S 23/00* (2018.05); *G05B 19/401* (2013.01); *F24D 2200/14* (2013.01); *F24D 2200/32* (2013.01); *G05B 2219/50333* (2013.01)

(58) Field of Classification Search
CPC .. F24S 10/40; F24S 20/40; F24S 23/00; F24S 90/00; F24D 5/005; F24D 19/109; F24D 2200/14; F24D 2200/32
See application file for complete search history.

(56) References Cited

U.S. PATENT DOCUMENTS

| | | | | |
|---|---|---|---|---|
| 3,106,201 A | * | 10/1963 | Steinberg | F24S 50/20 99/425 |
| 3,229,102 A | * | 1/1966 | Spencer | G01S 3/783 356/139.01 |
| 3,236,227 A | * | 2/1966 | Steinberg | F24S 20/30 126/682 |
| 3,301,171 A | * | 1/1967 | Steinberg | F24S 20/30 99/425 |
| 3,448,678 A | * | 6/1969 | Norman | A21B 1/48 198/848 |
| 3,866,334 A | * | 2/1975 | Huang | A24B 1/02 47/17 |
| 3,923,038 A | * | 12/1975 | Cutchaw | F24S 10/75 126/635 |
| 3,938,497 A | * | 2/1976 | Andrassy | F24S 20/30 126/400 |

(Continued)

FOREIGN PATENT DOCUMENTS

| | | | | | |
|---|---|---|---|---|---|
| CH | 697865 | A2 | * | 3/2009 | ............ F24J 2/07 |
| CN | 2924437 | Y | * | 7/2007 | |

(Continued)

OTHER PUBLICATIONS

Rajavi, Yashar. "Concentrating solar power." 3 pages, (2016).

(Continued)

*Primary Examiner* — Jorge A Pereiro
(74) *Attorney, Agent, or Firm* — Brooks Kushman P.C.

(57) ABSTRACT

Apparatuses and methods for using direct solar radiation. The apparatus may include a housing defining a window configured to transmit solar radiation and a secondary radiation source for transmitting a second radiation in response to the solar radiation via a non-transitory computer-readable medium having computer-readable instructions stored thereon and configured to be executed by a processor to measure the solar radiation and actuate the secondary radiation source.

20 Claims, 4 Drawing Sheets

(56) References Cited

U.S. PATENT DOCUMENTS

| | | | | |
|---|---|---|---|---|
| 4,069,593 | A * | 1/1978 | Huang | F26B 3/286 126/633 |
| 4,079,546 | A * | 3/1978 | Huang | A01G 7/00 47/58.1 R |
| 4,099,338 | A * | 7/1978 | Mullin | F26B 23/002 34/514 |
| 4,361,758 | A * | 11/1982 | Rotolo | G01S 3/784 136/246 |
| 4,398,391 | A * | 8/1983 | English, Jr. | F24S 23/30 60/641.15 |
| 4,421,015 | A * | 12/1983 | Masters | A47J 37/0635 426/243 |
| 4,490,926 | A * | 1/1985 | Stokes | F26B 3/286 34/76 |
| 4,491,727 | A * | 1/1985 | Appelbaum | G01J 1/4228 126/573 |
| 4,497,311 | A * | 2/1985 | Brandenburg, Jr. | F24S 80/50 126/606 |
| 4,619,244 | A * | 10/1986 | Marks | F24S 30/48 126/618 |
| 4,877,011 | A * | 10/1989 | Willice | A47J 37/0704 126/41 R |
| 4,890,599 | A * | 1/1990 | Eiden | F24S 30/452 126/606 |
| 5,001,846 | A * | 3/1991 | Andrassy | F26B 3/286 126/681 |
| 5,584,127 | A * | 12/1996 | Sutherland | F26B 9/066 126/681 |
| 6,490,801 | B1 * | 12/2002 | Hersom | B64G 1/36 33/DIG. 3 |
| 7,089,686 | B2 | 8/2006 | Lange et al. | |
| 7,658,017 | B1 * | 2/2010 | Laviolette | F26B 5/042 34/403 |
| 8,253,088 | B2 * | 8/2012 | Chen | G01J 5/12 126/573 |
| 9,126,434 | B2 * | 9/2015 | Jessen | B41J 11/00242 |
| 10,030,913 | B1 * | 7/2018 | Cao | F28D 15/0275 |
| 10,746,464 | B2 * | 8/2020 | Ileleji | F26B 9/003 |
| 2003/0104133 | A1 * | 6/2003 | Emch | F26B 3/283 427/557 |
| 2004/0043156 | A1 * | 3/2004 | Emch | F26B 3/283 427/407.1 |
| 2006/0051519 | A1 * | 3/2006 | Dixon | B05D 7/534 427/487 |
| 2007/0022625 | A1 * | 2/2007 | DeRegge | F26B 3/28 34/275 |
| 2007/0031281 | A1 * | 2/2007 | Stevens | A23L 3/28 422/24 |
| 2007/0256318 | A1 * | 11/2007 | Sugawara | F26B 3/286 34/93 |
| 2007/0294956 | A1 * | 12/2007 | Sugawara | F26B 23/10 52/173.3 |
| 2008/0063807 | A1 * | 3/2008 | DeRegge | F26B 3/28 427/508 |
| 2008/0090193 | A1 * | 4/2008 | Soanes | F26B 21/06 700/207 |
| 2008/0244924 | A1 * | 10/2008 | Chen | F26B 3/28 34/93 |
| 2012/0112473 | A1 * | 5/2012 | Glynn | B01D 1/0035 290/1 R |
| 2012/0196011 | A1 * | 8/2012 | Felix | A23L 3/28 426/243 |
| 2013/0119269 | A1 | 5/2013 | Olloquiegi Arrayago | |
| 2013/0312412 | A1 * | 11/2013 | Cheung | F03G 6/068 126/696 |
| 2016/0348968 | A1 * | 12/2016 | Wieland | F26B 21/10 |
| 2017/0141724 | A1 * | 5/2017 | O'Donnell | F24T 10/15 |
| 2017/0343220 | A1 * | 11/2017 | Ha | H05B 6/6485 |
| 2018/0008092 | A1 * | 1/2018 | Lee | F24C 7/04 |
| 2018/0054975 | A1 * | 3/2018 | Shur | A01G 7/045 |
| 2018/0159465 | A1 * | 6/2018 | Hu | H02S 20/30 |
| 2018/0238622 | A1 * | 8/2018 | Wieland | F26B 21/10 |
| 2018/0347858 | A1 * | 12/2018 | Hofbauer | F24S 10/744 |
| 2019/0003341 | A1 * | 1/2019 | VanDyne | F02G 3/02 |
| 2020/0116393 | A1 * | 4/2020 | Lin | F24S 20/40 |

FOREIGN PATENT DOCUMENTS

| | | | | |
|---|---|---|---|---|
| CN | 201488480 U | * | 5/2010 | |
| CN | 101936644 B | | 4/2012 | |
| CN | 102430505 A | | 5/2012 | |
| CN | 102809265 A | * | 12/2012 | |
| CN | 202973813 U | * | 6/2013 | |
| CN | 203024440 U | * | 6/2013 | |
| CN | 103375977 A | * | 10/2013 | |
| CN | 103726577 A | * | 4/2014 | |
| CN | 203550467 U | * | 4/2014 | |
| CN | 203654489 U | * | 6/2014 | |
| CN | 104457153 A | | 3/2015 | |
| CN | 106705636 A | * | 5/2017 | |
| CN | 106766795 A | * | 5/2017 | |
| CN | 106984506 A | * | 7/2017 | B05D 3/0254 |
| CN | 107747861 A | * | 3/2018 | F26B 15/16 |
| CN | 207354199 U | * | 5/2018 | |
| CN | 108180753 A | * | 6/2018 | |
| CN | 112728877 A | * | 4/2021 | F24S 20/30 |
| CN | 112856937 A | * | 5/2021 | F26B 17/04 |
| CN | 213119256 U | * | 5/2021 | |
| CN | 114608205 A | * | 6/2022 | |
| EP | 1150083 A1 | * | 10/2001 | C02F 11/12 |
| EP | 1264642 A2 | * | 12/2002 | B05D 3/0209 |
| EP | 1354640 A1 | * | 10/2003 | B05D 3/147 |
| EP | 3117906 A1 | * | 1/2017 | B05B 16/20 |
| EP | 3845849 A1 | | 7/2021 | |
| ES | 2379932 A1 | * | 5/2012 | |
| FR | 2490796 A | * | 3/1982 | A24B 1/02 |
| FR | 2680230 A1 | * | 2/1993 | F26B 25/001 |
| GB | 2015317 A | * | 9/1979 | A24B 1/02 |
| GB | 2273761 A | * | 6/1994 | F26B 21/08 |
| JP | H08327236 A | | 12/1996 | |
| JP | 2005114190 A | * | 4/2005 | F24J 2/02 |
| JP | 3868476 B1 | * | 1/2007 | |
| JP | 3868477 B1 | * | 1/2007 | F26B 17/04 |
| JP | 3893407 B1 | * | 3/2007 | F26B 3/286 |
| JP | 2007071440 A | * | 3/2007 | |
| JP | 3902644 B1 | * | 4/2007 | |
| JP | 2007112009 A | * | 5/2007 | |
| JP | 2007132573 A | * | 5/2007 | |
| JP | 2007285662 A | * | 11/2007 | |
| JP | 2008002794 A | * | 1/2008 | F26B 17/04 |
| JP | 2016002508 A | * | 1/2016 | |
| KR | 20110009601 A | | 1/2011 | |
| KR | 2014070158 A | * | 6/2014 | |
| KR | 1931613 B1 | * | 12/2018 | B09B 3/0083 |
| RU | 2022217 C1 | * | 10/1994 | |
| RU | 108827 U1 | * | 9/2011 | |
| RU | 154049 U1 | * | 8/2015 | |
| RU | 2736069 C1 | * | 11/2020 | F26B 17/04 |
| TW | 201024646 A | * | 7/2010 | |
| WO | WO-9415159 A1 | * | 7/1994 | F26B 21/08 |
| WO | WO-9428349 A1 | * | 12/1994 | E04D 13/03 |
| WO | WO-9615415 A1 | * | 5/1996 | F26B 23/10 |
| WO | WO-2005023437 A2 | * | 3/2005 | B05D 3/0209 |
| WO | WO-2007035995 A1 | * | 4/2007 | F26B 21/06 |
| WO | 2010144637 A1 | | 12/2010 | |
| WO | WO-2011017617 A1 | * | 2/2011 | A23L 3/00 |
| WO | WO-2011116882 A1 | * | 9/2011 | B05D 3/0466 |
| WO | WO-2012055634 A1 | * | 5/2012 | F24F 9/00 |
| WO | WO-2013025410 A1 | * | 2/2013 | F26B 25/00 |
| WO | WO-2013164285 A1 | * | 11/2013 | F26B 15/14 |
| WO | WO-2016120967 A1 | * | 8/2016 | B05B 12/122 |
| WO | WO-2018214048 A1 | * | 11/2018 | B05D 3/0254 |
| WO | WO-2019119108 A1 | * | 6/2019 | F24S 23/00 |
| WO | WO-2020154527 A1 | * | 7/2020 | B05D 3/0209 |

OTHER PUBLICATIONS

Jradi, Muhyiddine, and Saffa Riffat. "Medium temperature concentrators for solar thermal applications." International Journal of Low-Carbon Technologies 9.3 (2014): 214-224.

(56) References Cited

OTHER PUBLICATIONS

Interior Application, Brochure, www.solarinfrasystems.com, 2 pages.
Solar Infra Systems; Product Brochure; www.solarinfrasystems.com; 7 pages.
Solar Process Heat For Paintshops; Article; Automotive Manufacturing Solutions; https://www.automotivemanufacturingsolutions.com/solar-process-heat-for-paintshops/31633.article; 6 pages.

* cited by examiner

SYSTEMS AND METHODS FOR DIRECT USE OF SOLAR ENERGY

TECHNICAL FIELD

The present disclosure relates to systems and methods that use direct solar energy without voltaic conversion for energy intensive processes such as heating and curing.

BACKGROUND

Advances to reduce dependence on fossil fuels and use other energy sources are underway. A popular and prevalent alternative energy source is solar power. However, modern systems and methods for harnessing solar power rely on voltaic conversion (i.e., converting solar radiation from its original state to electric energy). For example, solar panels rely on a photo-voltaic processes for converting sunlight into electricity via chemical reactions. Although electricity is convenient for most applications and storage, the voltaic process requires chemicals and can be inefficient. This conversion is not necessary for every application.

SUMMARY

An apparatus for using solar energy directly is provided. The apparatus includes a housing having a window, a secondary radiation source, a non-transitory computer-readable medium having computer readable instructions stored thereon and a fixture positioned within the housing. The window is configured to transmit a first radiation into the housing and the secondary radiation source is configured to emit a second radiation which may supplement the first radiation. The instructions are configured to be executed by a processor to measure a first amount of the first radiation and actuate the secondary radiation source to emit a second amount of radiation based on the first amount of the first radiation. The fixture may be configured to position an article for receiving the first and second radiation.

A system for using solar energy directly is provided. The system includes a housing that defines a window and has a secondary radiation source, a non-transitory computer-readable medium having computer-readable instructions stored thereon and a fixture. The secondary radiation is configured to emit a second radiation. The computer instructions are to be executed by a computer to measure a first amount of the first radiation and actuate the secondary radiation source to emit a second amount of the second radiation in response to the first amount. The fixture is configured and positioned to supplement the first amount of the first radiation with the second amount of the second radiation thus obtaining a combined radiation.

A method for directly using solar energy is provided. The method includes measuring a first amount of a first radiation, radiating a second radiation at a second amount in response to the first amount and directing the first and second amounts to a fixture. The first radiation being transmitted through a window of a housing. The second radiation is emitted from a second radiation source within the housing. The fixture is configured to receive the first and second amount of radiation or configured to position an article for receiving the first and second amount of radiation.

A system for use of solar energy is provided. The system includes a housing defining a window, an absorptive material within the housing, a secondary heater, a non-transitory computer readable medium having computer readable instructions, and a fixture. The window is configured to transmit solar radiation into the housing and the absorptive material is positioned to receive that radiation and emit a first amount heat of within the housing. The secondary heater is configured to supplement or provide an additional amount of heat. The computer readable instructions are configured to be executed by a processor and include determining the first amount of heat and actuating the second heater to emit the additional heat based on the first amount of heat. The fixture is configured to receive the first and additional amounts of heat.

Another system for use of solar radiation is provided. The system includes a housing defining a window, a secondary ultraviolet radiation source, a non-transitory computer-readable medium with computer-readable instructions configured to be executed by a processor, and a fixture within the housing. The window is configured to transmit solar radiation into the housing. The secondary radiation source is configured to emit an additional amount of ultraviolet radiation as provided by the computer readable instructions after determining a first amount of ultraviolet radiation in the solar radiation received through the window. The instructions actuate the secondary radiation source to emit the additional amount of ultraviolet radiation in response to the first amount of ultraviolet radiation. The fixture is positioned within in the housing and configured to position an article for receiving the first and additional amounts of ultraviolet radiation.

DETAILED DESCRIPTION

Figure 1:
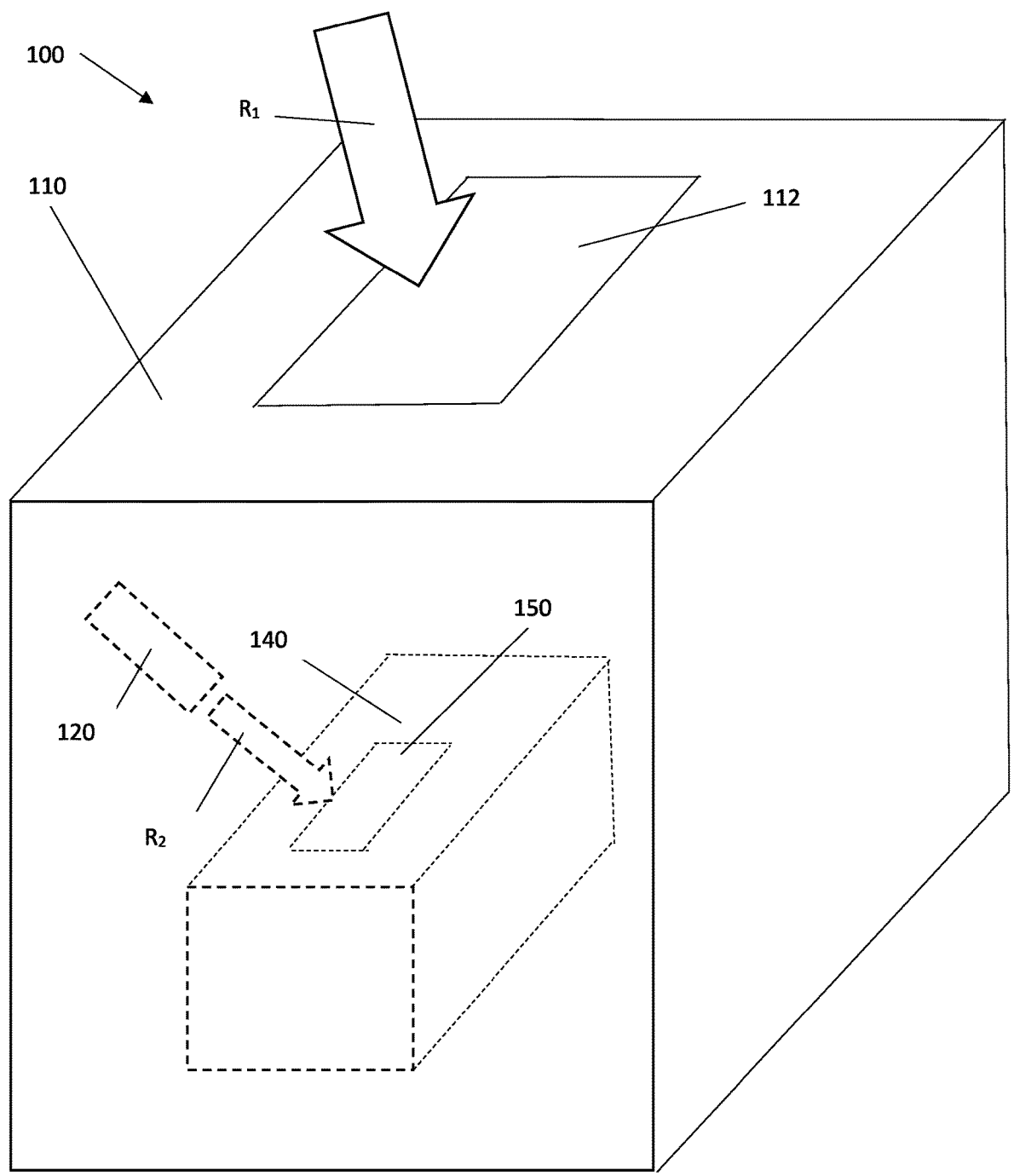
FIG. 1 is an apparatus for using solar radiation.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments of the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Moreover, except where otherwise expressly indicated, all numerical quantities in this disclosure are to be understood as modified by the word "about" in describing the broader scope of this disclosure. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for given purpose implies the mixtures of any two or more of the members of the group or class are equally suitable or preferred; molecular weights provided for any polymers refers to number average molecular weight; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

This disclosure is not limited to the specific embodiments and methods described below, as specific components and/or conditions may vary. Furthermore, the terminology used herein is used only for the purpose of describing particular embodiments and is not intended to be limiting in any way.

As used in the specification and the appended claims, the singular form "a," "an," and "the" comprise plural referents unless the context clearly indicates otherwise. For example, reference to a component in the singular is intended to comprise a plurality of components.

The term "substantially" or "generally" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

With respect to the terms "comprising," "consisting of," and "consisting essentially of," where one of these three terms is used herein, the presently disclosed and claimed subject matter can include the use of either of the other two terms.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

An apparatus for using solar energy without the need for voltaic conversion is provided. In FIG. 1, apparatus 100 includes housing 110 defining window 112, secondary radiation source 120, fixture 140 within housing 110 and a non-transitory computer readable medium having computer readable instructions. Window 112 is configured to transmit first radiation $R_1$ such as solar radiation into housing 110. Secondary radiation source 120 is configured to emit second radiation $R_2$ such as UV light, near UV light (i.e., 300-450), or thermal radiation which may supplement first radiation $R_1$ and/or may be configured to radiate fixture 140. The instructions are configured to be executed by a processor to measure a first amount of first radiation $R_1$ and actuate secondary radiation source 120 thus providing a second amount of second radiation $R_2$ based on the first amount of first radiation $R_1$. Fixture 140 may be configured to position article 150 such that it receives the first amount and second amount of radiation.

Housing 110 is not particularly limited and may be any suitable housing for defining window 112. In one embodiment, the housing may serve to at least partially separate the environment inside the housing from the environment outside the housing which may make managing or controlling the environment in housing 110 easier. For example, it may be desirable to control the temperature and or humidity in housing 110. Window 112 defined by housing 110 is not particularly limited in shape or size but should transmit first radiation $R_1$. First radiation $R_1$ may be solar radiation. In one variation, the window may be empty (i.e., an open orifice) however more preferably window 112 is any suitable material for transmitting solar radiation such as but not limited glass or an organic polymer. In a variation, window 112 may or may not absorb UV light, i.e., having a wavelength of 100-400 nm on the electromagnetic spectrum. In a refinement, window 112 may have a solar transmittance ($\tau_e$) of at least 60, or more preferably 70, or even more preferably 80 according to JIS R 3106 using a 5 mm thick material and as measured over a wavelength of 250-2500 nm. In still another refinement, window 112 may have a solar factor (g-value) of greater than 0.5, or more preferably greater than 0.6, or even more preferably greater than 0.7 per NFRC 201. Housing 110 may preferably be located on a roof or form a portion of a roof for better accessibility to the sun.

Secondary radiation source 120 may be any suitable source for generating a desired radiation. Secondary radiation source 120 may be a light, lamp, or heater for emitting UV light (e.g., 100-400 nm), near UV light (e.g., 300-450 nm), visible light (e.g., 400-700 nm) or thermal radiation (e.g., 100-100,000 nm). For example, secondary radiation source 120 may be one or more UV lamps, IR lamps, heating coils, heat lamps, and/or any other heaters. Secondary radiation source 120 may supplement or be combined with first radiation $R_1$. Secondary radiation source 120 may emit second radiation $R_2$ at a second amount based on the first amount of first radiation $R_1$ such that fixture 140 and/or article 150 receive a combined amount of radiation. Secondary radiation source 120 may also provide all the necessary or desired radiation when first radiation $R_1$ (e.g., solar radiation) is unavailable. For example, secondary radiation source 120 may provide all the desired radiation at night when solar radiation is not available.

Figure 3A:
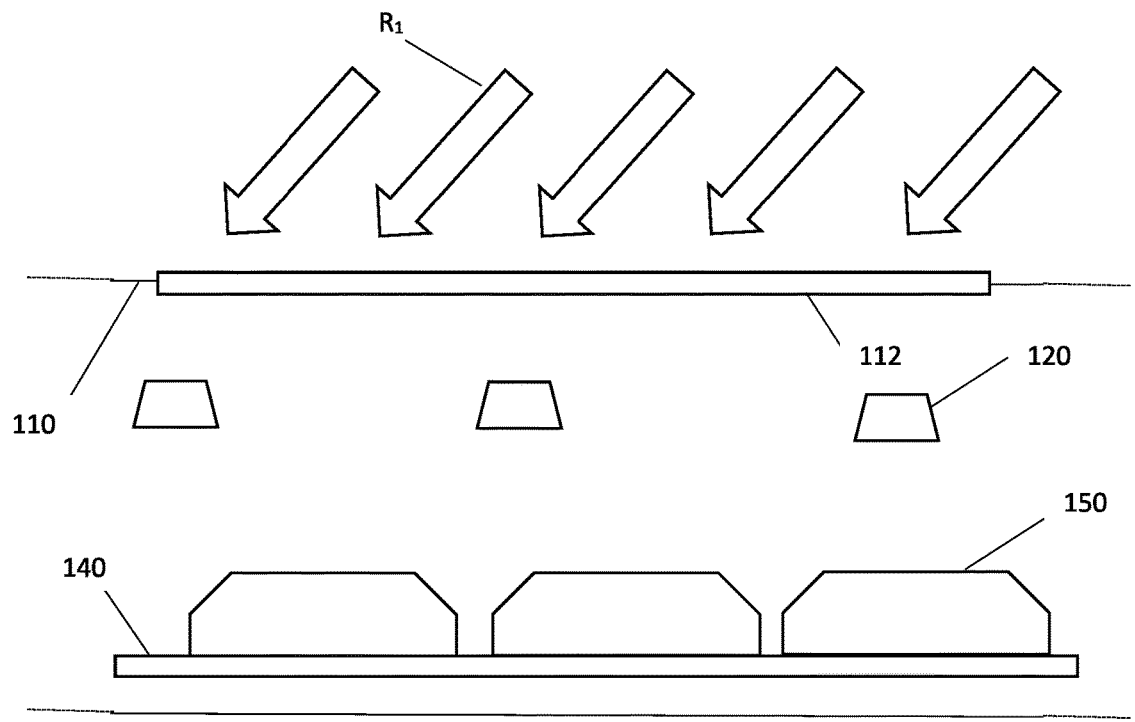
FIGS. 3A and 3B are systems for using solar radiation directly on a production line.

Fixture 140 may be positioned in the housing 110 for receiving the first and second radiation $R_1$, $R_2$. Fixture 140 may be any suitable fixture for positioning or holding article 150 in a position for receiving the first and second radiation $R_1$, $R_2$. Fixture 140 may be entirely or partially located in housing 110. Fixture 140 may hold or position more than one article for receiving the first and second radiation $R_1$, $R_2$. For example, fixture 140 may be a table or rack for holding article 150 or fixture 140 may be a conveyor system for transporting a plurality of articles into housing 110 and positioning them for receiving the first and second radiation $R_1$, $R_2$ for a period of time as shown in FIG. 3A. Article 150 is not particularly limited and may be any article that may benefit from the exposure to radiation. In a refinement, article 150 may include a wet or uncured composition that may be dried or cured by the first and second radiation $R_1$, $R_2$. For example, article 150 may be industrial equipment, a vehicle or a component thereof. Article 150 having a wet or uncured composition may be positioned for exposure to the first and second radiation $R_1$, $R_2$ for a predetermined period of time such as at least 1 minute, 5 minutes, 10 minutes, 15 minutes or 30 minutes. The predetermined time may be not more than 10 minutes, 15 minutes, 25 minutes, 30 minutes, or 1 hour. The predetermined period of time may be fixed based on the composition of the coating and/or may be based on the amount and/or intensity of the first and second radiation $R_1$, $R_2$.

Figure 3B:
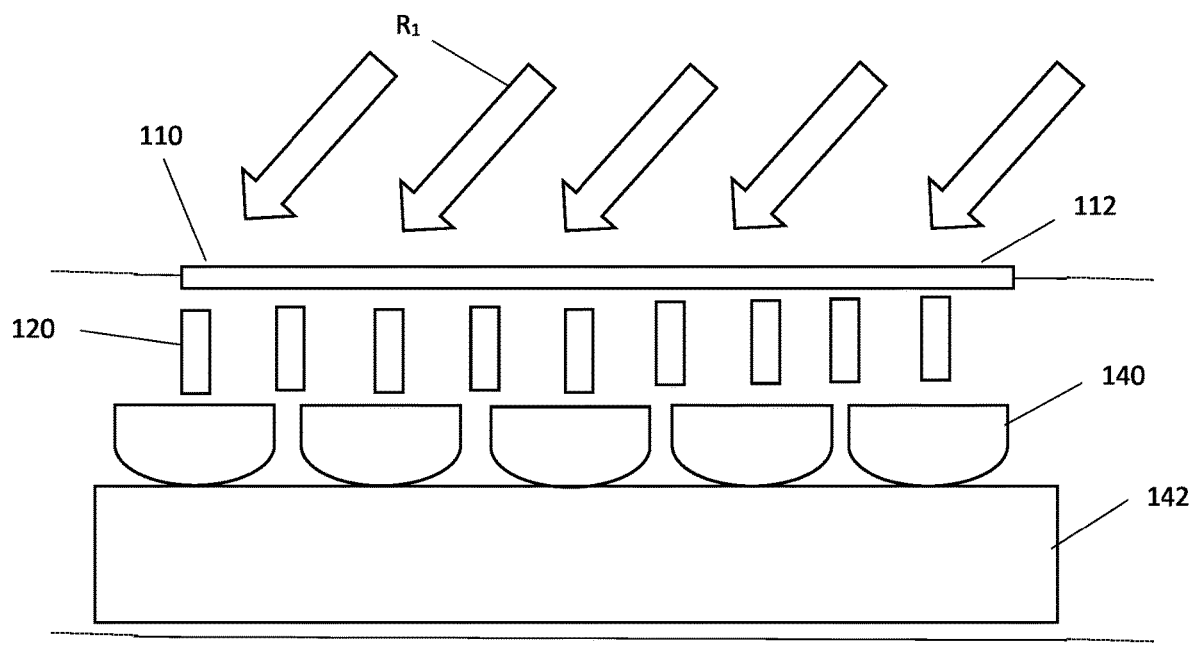

Fixture 140 may also be configured to absorb solar radiation and convert it to heat. Many materials may be suitable for absorbing solar radiation and converting it to heat, however dark materials may be more efficient because of their high absorption properties. In a refinement, suitable materials may withstand high UV and/or thermal exposure without degradation or without significant degradation. Fixture 140, for example, may include a dark surface or have a dark (e.g., black) backing or coating. In a variation, fixture 140 may be coated with a material that facilitates absorption and the conversion of solar radiation to heat (e.g., an absorptive material). When solar radiation enters through window 112 it will be absorbed by fixture 140 and release heat. Non-reflective materials or coatings may more effectively absorb solar radiation and convert it to heat. In a refinement, fixture 140 may be made of or coated with a material that is designed to withstand direct solar radiation for extended periods of time. Fixture 140 may further include a material that has a high thermal conductivity such that it can easily transfer heat to article 150 or another object such as a duct 142 as shown in FIG. 3B. For example, the fixture may include a material having a thermal conductivity of at least 1 W/mK, more preferably, at least 100 W/mK, or even more preferably at least 200 W/mK per ASTM C177. Fixture 140 may be immediately adjacent to a (zephyr) duct 142 to conduct heat generated by absorbing solar radiation to the duct 142 for heating. Fixture 140 may be a stone, mineral, cement, ceramic, or metal material. More preferably a coated metallic material may be used. In another refinement, first and second radiation $R_1$, $R_2$ may be directly transmitted to a duct 142 (i.e., fixture 140 may be a duct 142). The duct 142 may contain a volume of air that is heated by fixture 140 and can be transferred to another location. Fixture 140 may be any shape and size suitable for receiving first radiation $R_1$.

The non-transitory computer-readable medium having computer-readable instructions configured to be executed by a processor provides for carrying out various functions for operation of apparatus 100 such as measuring an amount and/or intensity of first radiation $R_1$. A sensor may be used to measure the amount and/or intensity of first radiation $R_1$ or a proxy parameter for determining the amount of first radiation $R_1$. Alternatively, time and/or weather may be used to calculate an anticipated amount of solar radiation and/or the most suitable locations and/or directions for receiving that radiation. For example, UV irradiance/intensity and/or spectral distribution may be measured. Various sensors at different locations may be used to measure the first radiation from different locations (i.e., a plurality of measurements).

A specific location may yield a greater amount of radiation compared to other or adjacent locations. This location or direction may change, for example, throughout the day based on the movement of the sun, weather conditions, or obstructions interfering with the path of solar radiation (i.e., trees, clouds, pollution, wildlife). Housing 110, portions thereof, or window 112 may be altered or adjusted to receive the first radiation from a location corresponding to a max amount. For example, the housing may include multiple windows or a moveable window such that the window faces the east during the early portion of a day and the west during the later portions of the day. The window may also face or primarily face the equator.

The processor may include one or more devices selected from high-performance computing systems including high-performance cores, microprocessors, micro-controllers, digital signal processors, microcomputers, central processing units, field programmable gate arrays, programmable logic devices, state machines, logic circuits, analog circuits, digital circuits, or any other device that manipulate signals (analog or digital) based on computer-executable instructions residing in the memory. The memory may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information. The non-volatile storage may include one or more persistent data storage devices such as a hard drive, optical drive, tape drive, non-volatile solid state device, cloud storage or any other device capable of persistently storing information.

Executable instruction may reside in a software module. The software module may include operating systems and applications. The software module may be compiled or interpreted from a computer program created using a variety of programming languages and/or technologies, including, without limitation, and either alone or in combination, Java, C, C++, C#, Objective C, Fortran, Pascal, Java Script, Python, Perl, and PL/SQL. Non-volatile storage may also include data supporting the functions, features, calculations, and processes.

Computer readable storage media, which is inherently non-transitory, may include volatile or non-volatile, and removable and non-removeable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device form of a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement functions, acts, and/or operations described herein. The functions, acts, and/or operations described herein may be re-ordered, processed serially, and/or processed concurrently.

Figure 2:
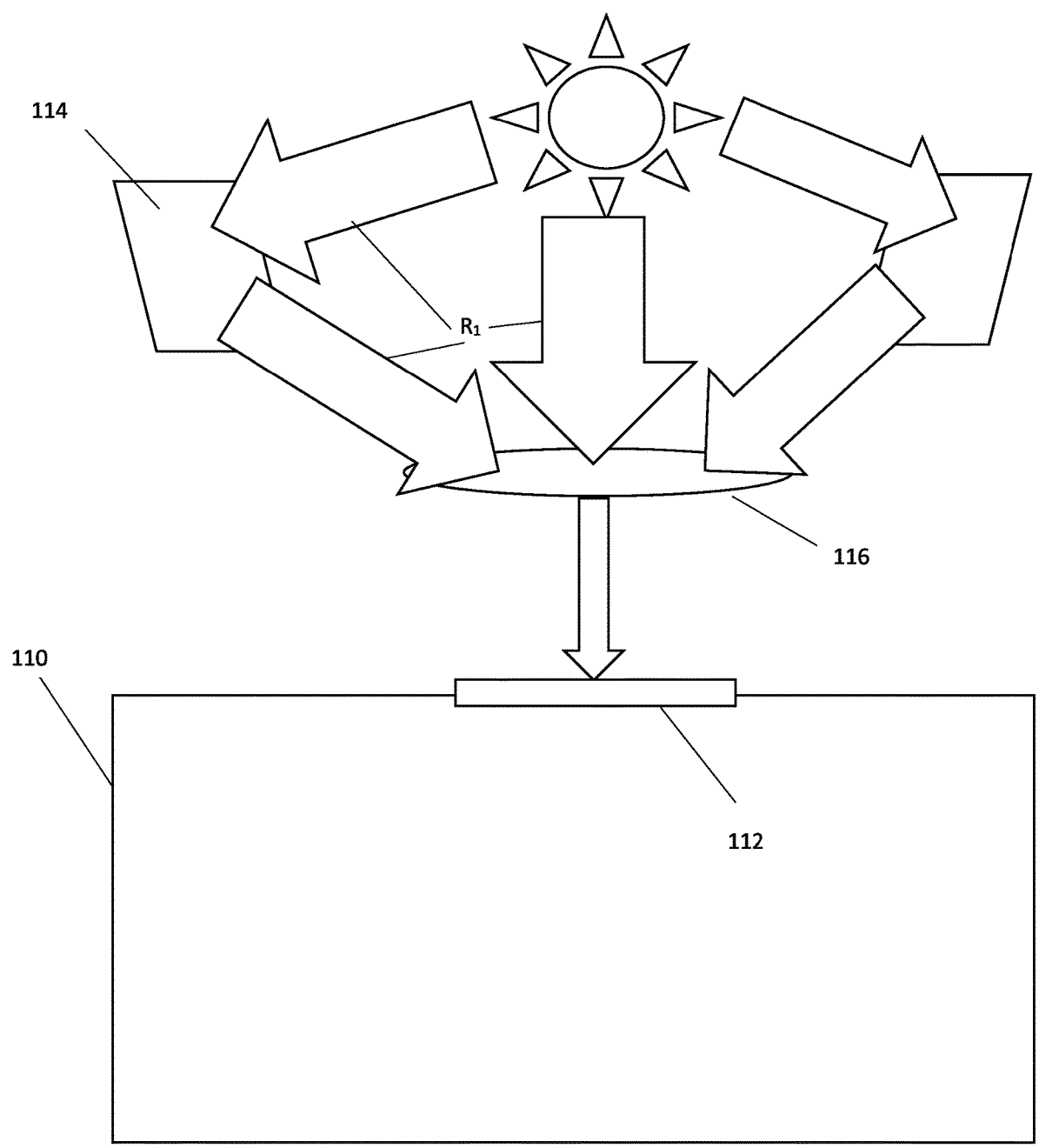
FIG. 2 is an apparatus with reflective material for directing solar radiation and refractive material for concentrating or focusing solar radiation.

In a refinement, a medium or material that changes the direction of solar radiation (e.g., reflection and refraction) such as mirrors or lenses may be used to collect, direct and/or focus the solar radiation from the location corresponding to the max amount or from multiple locations, which may or may not include the location corresponding to the max amount, through window 112. For example, reflective material 114 (e.g., a mirror) may be used to direct solar radiation from a large area through window 112 as shown in FIG. 2. Alternatively, or in combination, a refractive material 116 (e.g., a magnifying lens) may be used to direct solar radiation from a large area or focus solar radiation through window 112 as shown in FIG. 2. For example, a Fresnel magnifying lens may be used. The materials responsible for collecting, directing or focusing solar radiation may be aimed at locations or in direction that provide greater solar radiation. The instructions to be executed by a processor may automate aiming based on the plurality of measurements from different locations. The measured amount of the first radiation $R_1$ may be used to actuate the secondary radiation source 120 to emit the second amount of radiation. In other words, the second amount of radiation may be based on the first amount of radiation. For example, the instructions may provide that the processor determines the max or greatest amount from the plurality of measurements and then alters the reflective or refractive materials such that the face of those materials faces towards the direction(s) or location(s) corresponding to the max or greatest amount(s). The materials responsible for collecting, directing or focusing solar radiation (e.g., reflect and/or refractive materials) and/or the window 112 may be aimed at a location for capturing the most solar radiation by being mobile along an x-axis, y-axis and/or z-axis and/or being pivotal and/or rotational.

Figure 4:
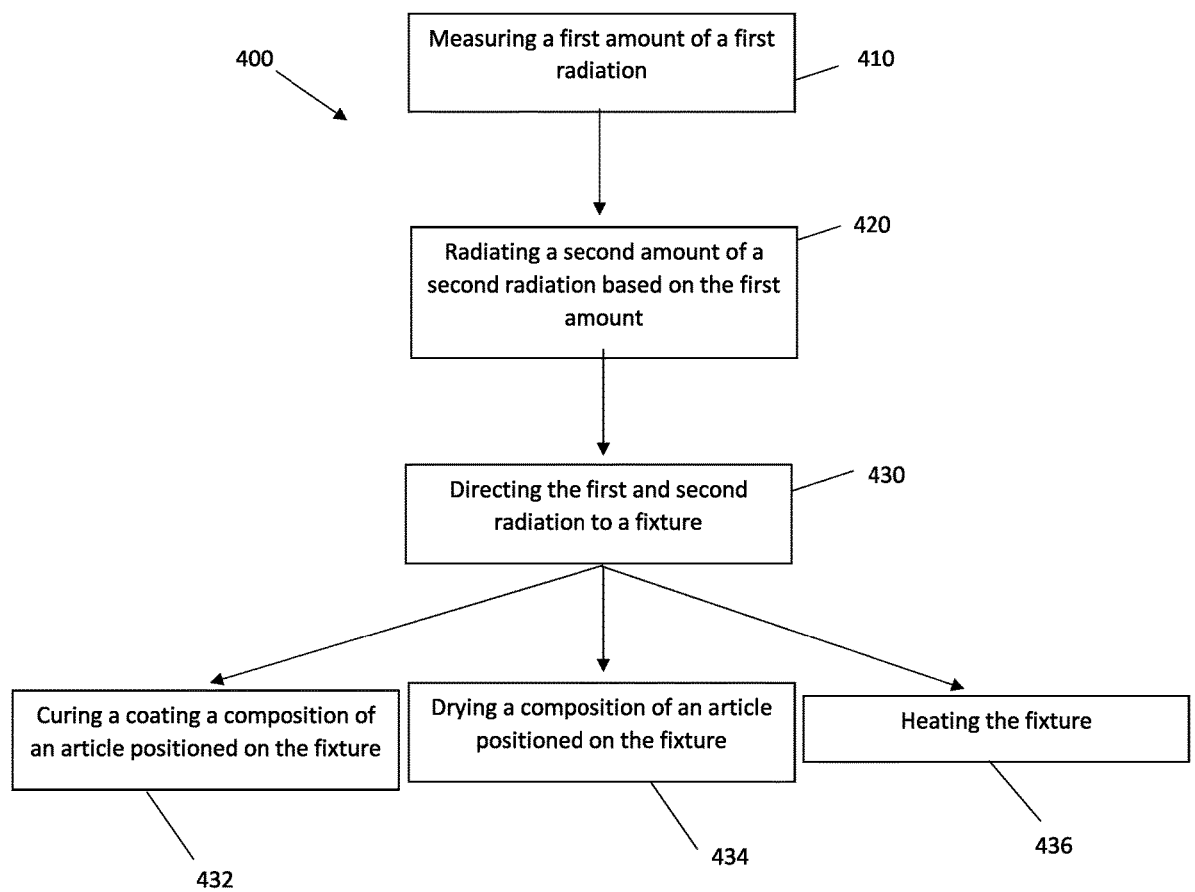
FIG. 4 is a flowchart depicting a method of using solar radiation.

In FIG. 4, method 400 for use of solar energy is provided. Method 400 includes measuring a first amount of a first radiation such as solar radiation transmitted or to be transmitted through a window of a housing (i.e., step 410), radiating a second radiation at a second amount in response to the first amount (i.e., step 420) and directing the first and second radiation to a fixture (i.e., step 430). The fixture may be configured to position an article in a first position for receiving the first and second radiation. A processor may be configured to receive instructions to radiate the second radiation at a second amount via a secondary radiation source in response to the first amount of the first radiation. Method 400 may include measuring a third amount of the first radiation and adjusting the second radiation to a fourth amount based on the third amount of the first radiation measured. This process may be continually repeated, for example, to ensure that any deviation in the first radiation is compensated for by the second radiation. A processor may be configured to receive instruction to continually or intermittently measure the first radiation and adjust the second radiation accordingly. Measurements may be taken every second, 5 seconds, 30 seconds, 60 second, 2 minutes, 5 minutes, 10 minutes, 15 minutes, 30 minutes or hour and used to adjust the second radiation. The instructions may further provide for aiming materials capable of changing the direction of solar radiation towards different location with a desired or greater amount of solar radiation and/or adjusting the location of the window. For example, the processor may open a window facing the east in the morning and aim a mirror and/or lens towards the sun for directing the solar radiation through the eastward facing window. In the evening a westward facing window may be used. Method 400 may also include positioning an article in the fixture for a predetermined period of time. The article may have a wet or uncured composition that may be cured (i.e., step 432) or dried (i.e., step 434) after the predetermined period of time and exposure to the first and second radiation. The uncured composition may for example, be cured by UV light or thermal exposure. Alternatively, the fixture may be heated (i.e., step 436) for heating another object or substance such as a duct.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An apparatus for use of solar energy comprising:
a housing including one or more walls defining a window such that an environment outside the housing is separated from an environment inside the housing, the window configured to transmit a solar radiation into the housing without voltaic conversion;
a duct within the housing, the duct having one or more partitions configured to contain a volume of air separate from the environment inside the housing such that the volume of air within the duct is heated by the solar radiation;
a secondary radiation source configured to emit a second radiation; and
a non-transitory computer-readable medium having computer-readable instructions stored thereon configured to be executed by a processor to perform the following functions:
measure a first amount of the solar radiation;
actuate the secondary radiation source to emit a second amount of the second radiation in response to the first amount of the solar radiation; and
a fixture configured to position a plurality of articles in a first position to cure an uncured composition on the plurality of articles by thermal exposure from the first amount of solar radiation and the second amount of second radiation wherein the fixture is a conveyor system.

2. The apparatus of claim 1, wherein the second radiation is electromagnetic radiation having a wavelength on an electromagnetic spectrum of between 100 and 1,000,000 nm.

3. The apparatus of claim 1, wherein the second radiation is thermal radiation.

4. The apparatus of claim 1, wherein the instructions further include the steps of measuring a plurality of amounts of radiation from different locations, the plurality of amounts having a max amount and receiving the solar radiation from at least a location corresponding to the max amount.

5. The apparatus of claim 1, wherein the housing includes an additional window for receiving the solar radiation.

6. The apparatus of claim 1, wherein a first medium is configured to change a direction of at least a portion of the solar radiation to direct it through the window.

7. The system of claim 6, wherein the first medium includes a Fresnel lens.

8. The apparatus of claim 1, wherein a lens focuses the solar radiation on an article of the plurality of articles when the article is positioned in the fixture.

9. The apparatus of claim 1, wherein the window includes a material having a solar factor greater than 0.5.

10. A system for use of solar energy comprising:
   a production line including a housing defining a space and including one or more windows each configured to transmit a solar radiation into the housing without voltaic conversion and made of a material having a solar transmittance of at least 60;
   a duct within the space and having one or more walls to contain a volume of air, the duct configured to absorb the solar radiation received from the one or more windows to heat the volume of air within the duct;
   a plurality of secondary radiation sources configured to emit a second radiation;
   a non-transitory computer-readable medium having computer-readable instructions stored thereon configured to be executed by a processor to perform the following functions:
   measure a first amount of the solar radiation; and
   actuate the secondary radiation sources to emit a second amount of the second radiation in response to the first amount of the solar radiation; and
   a fixture configured to supplement the first amount of the solar radiation with the second amount of the second radiation to attain a combined amount of radiation and configured to transport and expose a plurality of articles having an uncured coating composition to the combined amount of radiation.

11. The system of claim 10, wherein the solar radiation is directed and/or focused by a material that changes the direction of light.

12. The system of claim 11, wherein the solar radiation is directed and/or focused from multiple locations.

13. A system for use of solar energy comprising: a housing located on a roof or forming a portion of the roof and defining a window configured to transmit solar radiation into the housing; an absorptive material positioned to receive the solar radiation and emit a first amount of heat in the housing; a duct configured to receive the first amount of heat; a secondary heater configured to emit an additional amount of heat; and a non-transitory computer-readable medium having computer-readable instructions stored thereon configured to be executed by a processor to perform the following functions: determine the first amount of heat; actuate the secondary heater to emit the additional amount of heat in response to the first amount of heat; measure a third amount of heat from the solar radiation and adjust the additional amount of heat based on the third amount of heat; and a fixture within the housing configured to receive the first amount of heat and the additional amount of heat.

14. The system of claim 13, further comprising measuring solar radiation and adjusting the window, a refractive material, or reflective material, based on the measuring to increase the amount of solar radiation received through the window.

15. The system of claim 14, further comprising positioning an article via a conveyor system to receive the first and additional amount of heat over a predetermined amount of time.

16. A method for use of solar energy on a production line comprising:
   coating a plurality of articles with an uncured coating composition;
   measuring a first amount of a solar radiation transmitted through a window of a housing that is configured to generate a first thermal radiation to a volume of air disposed in a duct within the housing, the duct being separate from an environment in the housing;
   radiating a second radiation at a second amount in response to the first amount; and
   directing the first thermal radiation and second radiation to a fixture configured to position the plurality of articles in a position for receiving the first amount and second amount of radiation such that the uncured coating composition is cured.

17. The method of claim 16, further comprising the steps of measuring a third amount of the solar radiation and adjusting the second radiation to a fourth amount in response to the third amount of radiation.

18. The method of claim 16, further comprising the step of aiming the window or a material configured to change a direction of light towards a location that provides a predetermined amount of radiation or a greatest amount of radiation.

19. The method of claim 16, further comprising positioning an article of the plurality of articles in the fixture for a predetermined period of time.

20. The method of claim 16, wherein each article of the plurality of articles is industrial equipment, a vehicle, or a component thereof.

* * * * *